(12) United States Patent
Bush

(10) Patent No.: US 6,176,893 B1
(45) Date of Patent: *Jan. 23, 2001

(54) CONTROLLED RELEASE EMULSION FERTILIZER COMPOSITIONS

(75) Inventor: James H. Bush, Mentor, OH (US)

(73) Assignee: The Lubrizol Corporation, Wickliffe, OH (US)

( * ) Notice: Under 35 U.S.C. 154(b), the term of this patent shall be extended for 0 days.

This patent is subject to a terminal disclaimer.

(21) Appl. No.: 09/222,660

(22) Filed: Dec. 30, 1998

(51) Int. Cl.[7] .................. A01N 25/00; A01N 27/00; C05G 1/00
(52) U.S. Cl. ............. 71/64.11; 71/64.08; 71/64.01; 71/1; 516/27; 516/69; 516/71
(58) Field of Search ............... 71/64.08, 64.11, 71/64.01; 516/27, 69, 71

(56) References Cited

U.S. PATENT DOCUMENTS

| | | | |
|---|---|---|---|
| 3,255,108 | 6/1966 | Wiese | 252/32.7 |
| 3,269,946 | 8/1966 | Wiese | 252/32.5 |
| 4,216,114 | 8/1980 | Baker | 252/341 |
| 4,234,435 | 11/1980 | Meinhardt et al. | 252/51.5 A |
| 4,445,576 | 5/1984 | Drake et al. | 166/291 |
| 4,708,753 | 11/1987 | Forsberg | 149/2 |
| 4,818,309 | 4/1989 | Yabsley | 149/2 |
| 4,828,633 | 5/1989 | Forsberg | 149/2 |
| 4,844,756 | 7/1989 | Forsberg | 149/2 |
| 4,919,178 | 4/1990 | Riga et al. | 149/2 |
| 4,919,179 | 4/1990 | Chattopadhyay | 149/2 |
| 4,940,497 | 7/1990 | Van Ommeren | 149/2 |
| 5,047,175 | 9/1991 | Forsberg | 252/356 |
| 5,512,079 | 4/1996 | Jahnke et al. | 71/64.08 |
| 5,518,517 | 5/1996 | Jahnke et al. | 71/64.08 |
| 5,696,060 | 12/1997 | Baker et al. | 508/222 |
| 5,696,067 | 12/1997 | Adams et al. | 508/476 |
| 5,779,742 | 7/1998 | Baker | 44/330 |
| 5,859,264 | 1/1999 | Coupland et al. | 549/372 |
| 6,054,493 | * 4/2000 | Bush | 516/27 |

FOREIGN PATENT DOCUMENTS

| | | |
|---|---|---|
| 2007348 | 7/1991 | (CA) . |
| 102827 A2 | 3/1984 | (EP) . |
| 557568 A1 | 9/1993 | (EP) . |
| 561600 A2 | 9/1993 | (EP) . |
| WO93/01150 | 1/1993 | (WO) . |
| WO93/16968 | 9/1993 | (WO) . |

OTHER PUBLICATIONS

United States Defensive Publication T969,003 published Apr. 4, 1978.

* cited by examiner

*Primary Examiner*—Tom Dunn
*Assistant Examiner*—Eileen E. Nave
(74) *Attorney, Agent, or Firm*—Joseph P. Fischer; David M. Shold

(57) ABSTRACT

Non-explosive water in oil emulsion fertilizer compositions comprise a discontinuous aqueous phase comprising at least one fertilizer component, a continuous organic phase, an emulsifying amount of an emulsifier composition comprising: the reaction product of an amine (C) characterized by the presence within its structure of at least one H—N group and an intermediate formed in the reaction of (A) at least one olefinic compound containing at least one group of the formula

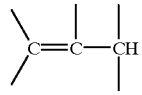

(I)

and (B) at least one carboxylic reactant selected from the group consisting of compounds of the formula

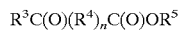

(III)

wherein each of $R^3$ and $R^5$ is independently H or a hydrocarbyl group, $R^4$ is a divalent hydrocarbylene group, and n is 0 or 1, and reactive sources thereof and optionally, from about 0.5 to about 2 moles, per mole of (B), of (D) at least one aldehyde or ketone. The fertilizer compositions provide for controlled release of the fertilizer components.

29 Claims, No Drawings

US 6,176,893 B1

CONTROLLED RELEASE EMULSION FERTILIZER COMPOSITIONS

FIELD OF THE INVENTION

This invention relates to water-in-oil emulsions and more particularly to water in oil emulsion fertilizer compositions comprising a continuous organic phase, a discontinuous aqueous phase containing water-soluble fertilizer components, and emulsifiers produced from particular hydrocarbyl substituted acylating agents.

BACKGROUND OF THE INVENTION

Amine derivatives of succinic anhydride have been used as emulsifiers. U.S. Pat. Nos. 5,512,079 and 5,518,517 disclose amine derivatives of succinic acylating agents for use as emulsifiers in delayed release emulsion fertilizers. Commonly owned, copending U.S. patent application Ser. No. 08/946,399 filed Oct. 7, 1997, now U.S. Pat. No. 5,858,055, discloses emulsion fertilizers containing Mannich emulsifiers.

Water-in-oil emulsions have been used for a variety of uses including emulsion explosives. Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, inter alia, in U.S. Pat. Nos. 5,047,175; and 4,828,633. The emulsifier is a salt derived from high molecular weight carboxylic acylating agent coupled to a low molecular weight carboxylic acylating agent. Succinic acids and anhydrides are the preferred acylating agents. Other examples of such water-in-oil explosive emulsions are disclosed in U.S. Pat. Nos. 3,447,978; 3,765,964; 3,985,593; 4,008,110; 4,097,316; 4,104,092; 4,218,272; 4,259,977; 4,357,184; 4,371,408; 4,391,659; 4,404,050; 4,409,044; 4,448,619; 4,453,989; and 4,534,809; and U.K. Patent Application GB 2,050,340A.

U.S. Pat. No. 4,710,248 discloses an emulsion explosive composition comprising a discontinuous oxidizer-phase dispersed throughout a continuous fuel phase with a modifier comprising a hydrophilic moiety and a lipophilic moiety. The hydrophilic moiety comprises a carboxylic acid or a group capable of hydrolyzing to a carboxylic acid. The lipophilic moiety is a saturated or unsaturated hydrocarbon chain. The emulsion explosive composition pH is above 4.5.

U.S. Pat. Nos. 4,840,687 and 4,956,028 disclose explosive compositions comprising a discontinuous oxidizer phase comprising at least one oxygen-supplying component, a continuous organic phase comprising at least one water-immiscible organic liquid, and an emulsifying amount of at least one nitrogen-containing emulsifier derived from (A) at least one carboxylic acylating agent, (B) at least one polyamine, and (C) at least one acid or acid-producing compound capable of forming at least one salt with said polyamine. Examples of (A) include polyisobutenyl succinic acid or anhydride. Examples of (B) include the alkylene polyamines. Examples of (C) include the phosphorus acids (e.g., O,S-dialkylphosphorotrithioic acid). These explosive compositions can be water-in-oil emulsions or melt-in-oil emulsions.

U.S. Pat. No. 4,863,534 discloses an explosive composition comprising a discontinuous oxidizer phase comprising at least one oxygen-supplying component, a continuous organic phase comprising at least one carbonaceous fuel, and an emulsifying amount of (A) at least one salt composition derived from (A)(1) at least one high-molecular weight hydrocarbyl-substituted carboxylic acid or anhydride, or ester or amide derivative of said acid or anhydride, the hydrocarbyl substituent of (A)(1) having an average of from about 20 to about 500 carbon atoms, and (A)(2) ammonia, at least one amine, at least one alkali or alkaline earth metal compound; and (B) at least one salt composition derived from B)(1) at least one low-molecular weight hydrocarbyl-substituted carboxylic acid or anhydride, or ester or amide derivative of said acid or anhydride, the hydrocarbyl substituent of (B)(1) having an average of from about 8 to about 18 carbon atoms, and (B)(2) ammonia, at least one amine, at least one alkali or alkaline earth metal, and/or at least one alkali or alkaline earth metal compound.

U.S. Pat. No. 4,822,433 discloses an explosive emulsion composition comprising a discontinuous phase containing an oxygen-supplying component and an organic medium forming a continuous phase wherein the oxygen-supplying component and organic medium are capable of forming an emulsion which, in the absence of a supplementary adjuvant, exhibits an electrical conductivity measured at 60° C., not exceeding 60,000 picomhos/meter. The reference indicates that the conductivity may be achieved by the inclusion of a modifier which also functions as an emulsifier. The modifier is comprised of a hydrophilic moiety and a lipophilic moiety. The lipophilic moiety can be derived from a poly[alk(en)yl] succinic anhydride. Poly(isobutylene) succinic anhydride having a number average molecular weight in the range of 400 to 5000 is specifically identified as being useful. The hydrophilic moiety is described as being polar in character, having a molecular weight not exceeding 450 and can be derived from polyols, amines, amides, alkanol amines and heterocyclics. Example 14 of this reference discloses the use of a 1:1 condensate of polyisobutenyl succinic anhydride (number average molecular weight=1200) and dimethylethanol amine as the modifier/emulsifier.

U.S. Pat. No. 4,919,178 discloses water in oil emulsion explosives in which the emulsifier is the reaction product of two components. The first component is the reaction product certain carboxylic acids or anhydrides, including substituted succinic acids and anhydrides with ammonia or an amine and an alkali metal or an alkaline earth metal. The second component is the salt of a phosphorous containing acid.

European Patent application EP 561,600 A discloses a water-in-oil emulsion explosive in which the emulsifier is the reaction product-of a substituted succinic acylating agent, having at least 1.3 succinic groups per equivalent weight of substituents, with ammonia and/or an amine. The substituent is a polyalkene having an number average molecular weight of greater than 500 and preferably 1300–1500.

U.S. Pat. No. 4,919,179 discloses a water-in-oil emulsion explosive wherein the emulsifier is a particular type of ester of polyisobutenyl succinic anhydride.

U.S. Pat. No. 4,844,756 discloses a water-in-oil emulsion explosive wherein the emulsifier is a salt produced by reacting a hydrocarbyl substituted carboxylic acid or anhydride, including substituted succinic acids and anhydrides, with ammonia, an amine, and/or an alkali or alkaline earth metal.

U.S. Pat. No. 4,818,309 discloses a water-in-oil emulsion explosive wherein the emulsifier is a polyalkenyl succinic acid or derivative thereof. The succinic acid may be used in the form of an anhydride, an ester, an amide or an imide. A condensate with ethanolamine is preferred.

U.S. Pat. No. 4,708,753 discloses a water-in-oil emulsion suitable for use in explosive and functional fluids wherein the emulsifier is a reaction product of a hydrocarbyl substituted carboxylic acid, including a succinic acid, with an amine. The substituent contains 20–500 carbon atoms, and the aqueous phase contains a water soluble, oil insoluble functional additive.

European Patent EP 102,827 A discloses a water-in-oil emulsion composition useful as a well control fluid. The emulsifier is a polyamine derivative, especially an alkylene polyamine derivative, of a polyisobutenyl succinic anhydride or a borated or carboxylated derivative thereof.

U.S. Pat. No. 4,445,576 discloses a water-in-oil emulsion composition useful as a spacer fluid in well drilling. The emulsifier is an amine derivative, especially a polyamine derivative, of a polyalkenyl succinic anhydride.

U.S. Pat. No. 4,999,062 describes an emulsion explosive composition comprising a discontinuous phase comprising an oxygen-releasing salt, a continuous water-immiscible organic phase and an emulsifier component comprising a condensation product of a primary amine and a poly[alk(en)yl]succinic acid or anhydride and wherein the condensation product comprises at least 70% by weight succinimide product.

U.S. defensive publication T969,003 discloses water in oil emulsion fertilizer compositions prepared by dissolving an invert emulsifier in an oil such as kerosene. A liquid (aqueous) fertilizer is emulsified with the oil to form an invert emulsifier.

Patent application WO93/16968 discloses a method of transport and storage of fertilizer compositions. The nutrient portion of the fertilizer composition is in the form of the discontinuous water phase of a water in oil emulsion. The emulsifier is added to the oil prior to mixing together the aqueous and oil phases.

Patent application WO96/28436 describes gamma and delta lactones of formulae (I) and (II)

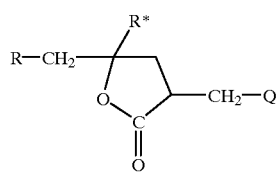

(I)

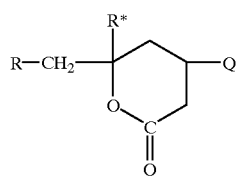

(II)

used as emulsifiers in explosive compositions comprising a continuous organic phase and a discontinuous aqueous phase containing an oxygen-supplying compound. In the formulae, R is hydrocarbyl, R* is hydrogen, methyl or another hydrocarbyl, and Q is an amide, ammonium salt or ester functionality.

British patent application 0557568A1 discloses fertilizer compositions comprising dispersions or solutions of nutrient supplying fertilizer components and the method for its manufacture. The solution/dispersion constitutes the discontinuous phase of a water in oil emulsion.

B. B. Snider and J. W. van Straten, J. Org. Chem., 44, 3567–3571 (1979) describe certain products prepared by the reaction of methyl glyoxylate with several butenes and cyclohexenes. K. Mikami and M. Shimizu, Chem. Rev., 92, 1021–1050 (1992) describe carbonyl-ene reactions, including glyoxylate-ene reactions. D. Savostianov (communicated by P. Pascal), C. R. Acad. Sc. Paris, 263, (605–7) (1966) relates to preparation of some α-hydroxylactones via the action of glyoxylic acid on olefins. M. Kerfanto et. al., C. R. Acad. Sc. Paris, 264, (232–5) (1967) relates to condensation reactions of α-αdi-(N-morpholino)-acetic acid and glyoxylic acid with olefins. B. B. Jarvis et al, Synthesis, 1079–82 (1990) relates to reactions of oxocarboxylic acids with olefins under acidic conditions to give α-hydroxy butyrolactones.

U.S. Pat. Nos. 5,696,060, 5,696,067 and 5,779,742 describe nitrogen containing derivatives of carboxylic acylating agents derived from the reaction product of an amine (C) characterized by the presence within its structure of at least one H—N group and an intermediate formed in the reaction of (A) at least one olefinic compound containing at least one group of the formula

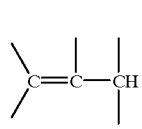

(I)

and (B) at least one carboxylic reactant selected from the group consisting of compounds of the formula

$R^3C(O)(R^4)_nC(O)OR^5$ (IV)

wherein each of $R^3$ and $R^5$ is independently H or a hydrocarbyl group, $R^4$ is a divalent hydrocarbylene group, and n is 0 or 1, and reactive sources thereof, in amounts ranging from 0.6 moles (B) per mole of (A) to 3 moles (B) per equivalent of (A). In an optional embodiment, the intermediate is prepared by including in the reaction from about 0.5 to about 2 moles, per mole of (B), of (D) at least one aldehyde or ketone. These are describe as useful as performance improving additives for lubricating oil composition.

SUMMARY OF THE INVENTION

This invention is directed to water-in-oil emulsions which are useful as non-explosive emulsion fertilizers. These emulsions comprise a discontinuous aqueous phase comprising at least one nutrient supplying fertilizer component, a continuous organic phase, and an emulsifying amount of an emulsifier composition comprising:
  the reaction product of an amine (C) characterized by the presence within its structure of at least one H—N group and an intermediate formed in the reaction of
    (A) at least one olefinic compound containing at least one group of the formula

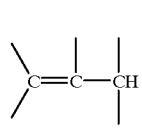

(I)

and
    (B) at least one carboxylic reactant selected from the group consisting of compounds of the formula

$R^3C(O)(R^4)_nC(O)OR^5$ (III)

wherein each of $R^3$ and $R^5$ is independently H or a hydrocarbyl group, $R^4$ is a divalent hydrocarbylene group, and n is 0 or 1, and reactive sources thereof, in amounts ranging from 0.6 moles (B) per mole of (A) to 3 moles (B) per equivalent of (A). In an optional embodiment, the intermediate is prepared by including in the reaction from about 0.5 to about 2 moles, per mole of (B), of (D) at least one aldehyde or ketone.

DETAILED DESCRIPTION OF THE PREFERRED EMBODIMENTS

It is an object of this invention to provide fertilizer compositions, especially compositions that release the fertilizer components at a controlled rate. More particularly, it is an object of the invention to provide non-explosive water in oil emulsion fertilizer compositions with controlled fertilizer release properties.

The fertilizer compositions of the present invention are water in oil emulsions using the above-described emulsifiers. The inventive fertilizer compositions comprise a discontinuous aqueous phase comprising at least one water soluble nutrient supplying fertilizer, a continuous organic phase comprising at least one oil, as defined in greater detail hereinbelow, and an emulsifying amount of one of the emulsifiers of this invention.

The fertilizer emulsion compositions of the present invention share some characteristics with explosive emulsions. For example, both are water in oil emulsions and both may include ammonium nitrate as a component. However, the fertilizer compositions are different from the explosive emulsions in that the ability to detonate is a necessary feature of emulsion explosives and is an undesirable characteristic of an emulsion fertilizer. There are several ways to assure that an emulsion fertilizer is non- explosive. It is important to avoid materials which may act as sensitizer in explosive emulsions. Sensitizers include, for example, glass or resin microspheres or other gas containing particles, self explosive materials such as TNT, DNT, RDX and the like and various organic nitrates. Explosive emulsions may also contain particulate oxygen supplying salts such as potassium perchlorate. Extra quantities of oxygen supplying salts are to be avoided in fertilizer compositions. Ammonium nitrate is commonly used in both emulsion explosives and fertilizer compositions. Urea may be used to replace some of the ammonium nitrate resulting in an emulsion with reduced tendency to explode. Inclusion of other fertilizer components which are not oxidizing salts, for example, phosphates, tend to make the emulsions less explosive. By use of one or combination of the methods described above, the fertilizer compositions of this invention may be rendered non-explosive.

When ordinary fertilizer components are applied, the nutrients they contain are released very quickly. If they are not absorbed very quickly, either by the soil or by the plant material, they may be lost. For example, nutrients may be lost to the surrounding environment not only resulting in loss of nutrients for the growing plants, but also resulting in pollution of groundwater, lakes and streams. Thus, it is desirable to provide fertilizers which release their nutrient components over a period of time thereby providing better utilization of the applied fertilizer as well as reduced pollution.

Generally speaking, the more oil and emulsifier in the composition, the slower the release of fertilizer components. However, oil and emulsifier are not fertilizer components in that they do not provide nutrition to plants. In addition, oil itself may be environmentally undesirable. Accordingly, it is desired to obtain sustained release with as low levels of oil and emulsifier as possible, The fertilizer compositions of the present invention are designed to provide controlled release of the fertilizer components. Surprisingly, it has been found that the emulsifiers of the present invention provide controlled release of fertilizer components at low levels of oil and emulsifier.

The compositions are intended for use in all agricultural areas including home use and commercial use. Thus, biodegradability of the oil phase is particularly important in fertilizer compositions.

The term "emulsion" as used in this specification and in the appended claims is intended to cover water in oil emulsions. The water in oil emulsions have a discontinuous aqueous phase containing fertilizer components suspended in a continuous oil phase.

As used herein, the terms "hydrocarbon" or "hydrocarbon based" means a group which is purely hydrocarbon, that is, a compound of hydrogen and carbon containing no hetero atoms. The term "hydrocarbyl" means that the group being described has predominantly hydrocarbon character within the context of this invention. Hydrocarbyl groups include groups that are purely hydrocarbon in nature, that is, they contain only carbon and hydrogen. They may also include groups containing non-hydrocarbon substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms. Thus, the term "hydrocarbyl" is broader than the terms "hydrocarbon" or "hydrocarbon based" since all hydrocarbon and hydrocarbon based groups are also hydrocarbyl groups while the hydrocarbyl groups containing hetero atoms are not hydrocarbon or hydrocarbon based groups.

In general, no more than about three non-hydrocarbon substituents or hetero atoms, and preferably no more than one, will be present for every 10 carbon atoms in the hydrocarbyl based groups. Most preferably, the groups are purely hydrocarbon in nature, that is they are essentially free of atoms other than carbon and hydrogen.

The Emulsifier Compositions

In one embodiment, the compositions of this invention employ an emulsifier comprising a compound of the formula

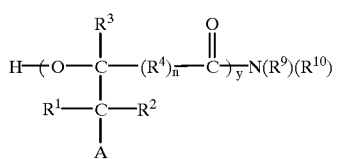

wherein A is a hydrocarbyl group or a hydroxy-substituted hydrocarbyl group. In one embodiment A is selected from groups of the formula

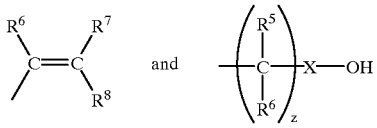
and
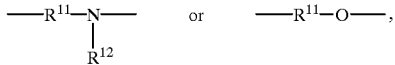

wherein z=0 or 1;

X is a divalent hydrocarbyl group selected from the group consisting of
$C(R^6)(C(R^5)(R^7)(R8))$ when z=0, and
$C(R^7)(R^8)$ when z=1; and
each of $R^5$, $R^6$, $R^7$, and $R^8$ is independently H or a hydrocarbon based group.

$R^5$ is H or hydrocarbyl. When $R^5$ is hydrocarbyl, it is usually an aliphatic group, often a group containing from 1 to 30 carbon atoms, often from 8 to 18 carbon atoms. In another embodiment, $R^5$ is lower alkyl, wherein "lower alkyl" is defined hereinabove. Most often, $R^5$ is H or lower alkyl.

When at least one of $R^6$, $R^7$ and $R^8$ is a hydrocarbyl group, it preferably contains from 7 to 5,000 carbon atoms. More often, such hydrocarbon groups are aliphatic groups. In one embodiment $R^6$ is an aliphatic group containing from 10 to 300 carbon atoms. In another embodiment, $R^6$ contains from 30 to 100 carbon atoms and is derived from homopolymerized and interpolymerized $C_{2-18}$ olefins.

In a further embodiment, at least one of $R^7$ and $R^8$ is an aliphatic group containing from 10 to 300 carbon atoms. Often, at least one of $R^7$ and $R^8$ contains from 30 to 100 carbon atoms and is derived from homopolymerized and interpolymerized $C_{2-18}$ olefins. The polymerized olefins are frequently 1-olefins, preferably ethylene, propylene, butenes, isobutylene, and mixtures thereof. Polymerized olefins are often referred to herein as polyolefins.

In yet another embodiment at least one of $R^7$ and $R^8$ is an aliphatic group containing from 8 to 24 carbon atoms. In another embodiment at least one $R^7$ and $R^8$ is an aliphatic group containing 12 to 50 carbon atoms. Within this embodiment, most often one of $R^7$ and $R^8$ is H and the other is the aliphatic group.

Each of $R^1$ and $R^2$ is H or a hydrocarbon based group. In one particular embodiment, each of $R^1$ and $R^2$ is independently H or a lower alkyl group provided at least one is lower alkyl. In another embodiment, one of $R^1$ and $R^2$ is H and the other is lower alkyl. As used herein, the expression "lower alkyl" refers to alkyl groups containing from 1 to 7 carbon atoms. Examples include methyl, ethyl and the various isomers of propyl, butyl, pentyl, hexyl and heptyl. In one especially preferred embodiment, each of $R^1$ and $R^2$ is H.

$R^3$ is H or hydrocarbyl. These hydrocarbyl groups are usually aliphatic, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from 1 to 3 carbon atoms. The 'n' is 0 or 1; that is, in one embodiment $R^4$ is present and in another embodiment, $R^4$ is absent. More often, $R^4$ is absent.

In one preferred embodiment, each of $R^1$, $R^2$ and $R^3$ is independently hydrogen or a lower alkyl or alkenyl group. In one especially preferred embodiment, each of $R^1$, $R^2$ and $R^3$ is hydrogen and each of y and n=0.

In another preferred embodiment, $R^6$ is an aliphatic group containing from 8 to 150 carbon atoms, $R^5$ is H, n is 0 and $R^3$ is H.

The subscript 'y' is an integer ranging from 1 to 200, more often from 1 to 50 and even more often from 1 to 20. Frequently y is 1.

Each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula $-(Y)_a R^{11} - B$, wherein each Y is a group of the formula $$-R^{11}-N-\underset{R^{12}}{|} \qquad \text{or} \qquad -R^{11}-O-,$$

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, and a is 0 or a number ranging from 1 to 100 (in this case preferably no more than three $R^9$, $R^{10}$, and $R^{12}$ contain amide groups, imide-containing groups, acylamino groups or amide-containing groups); or $R^9$ and $R^{10}$ taken together with the adjacent N constitute a nitrogen-containing heterocyclic group; or one of $R^9$ and $R^{10}$ taken together with the adjacent N constitute a N—N group.

These and other compositions which now have been found to be useful as emulsifiers in the compositions of the present invention are described in U.S. Pat. Nos. 5,696,060; 5,696,067; and 5,779,742. It should be understood that these references teach the materials and the use thereof in lubricating oil compositions. They do not teach or suggest the use of the materials as emulsifiers or in emulsions containing them.

The Method of Preparation of Emulsifier Compositions

The emulsifier compositions used in this invention are prepared by first reacting, optionally in the presence of an acidic catalyst selected from the group consisting of organic sulfonic acids, heteropolyacids, Lewis acids, and mineral acids, (A) at least one olefinic compound containing at least one group of the formula

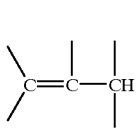

(I)

and (B) at least one carboxylic reactant selected from the group consisting of at least one carboxylic reactant selected from the group consisting of compounds of the formula $R^3C(O)(R^4)_n C(O)OR^5$ (III)

wherein each of $R^3$ and $R^5$ is independently H or a hydrocarbyl group, $R^4$ is a divalent hydrocarbylene group, and n is 0 or 1, and reactive sources thereof in amounts ranging from 0.6 moles (B) per mole of (A) to 3 moles (B) per equivalent of (A), to form an intermediate. Subsequently, an amine (C) characterized by the presence within its structure of at least one H—N group is reacted with the intermediate produced in the reaction of A and B above, to form the emulsifier. In an optional embodiment, the intermediate is prepared by including in the reaction from about 0.5 to about 2 moles, per mole of (B), of (D) at least one aldehyde or ketone;

In the preparation of the intermediate, all of reactants (A) and (B), and optionally (D), may be present at the same time. However, it has been found that improvements in yield and purity of the product arising from the reaction of (A) and (B) are often attained when the carboxylic reactant (B) is added to the olefinic compound (A) either portionwise or continuously over an extended period of time, usually up to about 10 hours, more often from 1 hour up to about 6 hours, frequently from about 2 to about 4 hours.

The reaction of the olefin and carboxylic reactant is conducted, usually under an inert atmosphere such as $N_2$, at temperatures ranging from ambient up to the lowest decomposition temperature of any of the reactants, usually from about 60° C. to about 220° C., more often from about 120° C. to about 180° C., preferably up to about 160° C. The process employs from about 0.6 moles (B) per mole of (A) to 3 moles (B) per equivalent of (A), more often from about 1.8 moles (B) per mole of (A) to about 2.5 moles (B) per equivalent of (A), even more often from about 1.9 moles (B) per mole of (A) to about 2.1 moles (B) per equivalent of (A). The reaction may be conducted in the presence of an azeotroping solvent to remove $H_2O$ from the reactants or $H_2O$ formed during the reaction. Well known azeotroping solvents include toluene, xylene, cyclohexane, etc. Cyclohexane is the preferred azeotroping solvent.

Depending upon reaction conditions, the reaction of the carboxylic reactant (B) and the olefinic compound (A) yields a variety of products.

In one embodiment, described in U.S. Pat. No. 5,777,142 to Adams et al, wherein the ratio of reactants ranges from about 0.6 moles (B) per equivalent of (A), to about 1.5 moles (B) per equivalent of (A), a composition comprising a compound of the formula

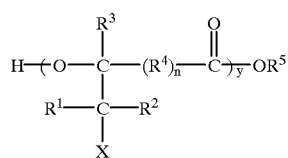

wherein each of $R^1$ and $R^2$ is H or a hydrocarbon based group, $R^3$ is H or hydrocarbyl;

$R^4$ is a divalent hydrocarbylene group;

n=0 or 1;

y is an integer ranging from 1 to about 200;

$R^5$ is H or hydrocarbyl; and

X is a group of the formula

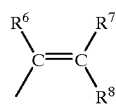

wherein each of $R^6$, $R^7$ and $R^8$ is independently H or a hydrocarbon based group provided that at least one of $R^1$, $R^2$, $R^6$, $R^7$ and $R^8$ is a hydrocarbon based group containing at least 7 carbon atoms, is obtained In another embodiment, described in European Patent Publication 759,443, carrying the reaction further provides a composition comprising a compound of the formula

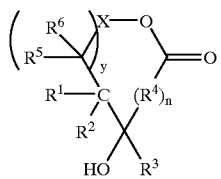

each of $R^1$ and $R^2$ is H or a hydrocarbon based group, $R^3$ is H or hydrocarbyl;

$R^4$ is a divalent hydrocarbylene group;

n=0 or 1;

y=0 or 1;

wherein X is a divalent hydrocarbyl group selected from the group consisting of

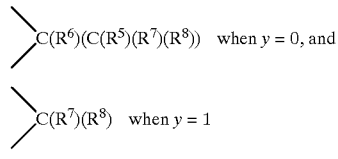

$R^5$ is H or hydrocarbyl; and each of $R^6$, $R^7$ and $R^8$ is independently H or a hydrocarbon based group, provided that at least one of $R^1$, $R^2$, $R^6$, $R^7$ and $R^8$ is a hydrocarbon based group containing at least 7 carbon atoms.

In yet another embodiment, described in U.S. Pat. No. 5,739,356, when the reactants are reacted in amounts ranging from more than 1.5 moles up to about 3 moles (B) per equivalent of (A), a composition comprising regioisomers selected from the group consisting of

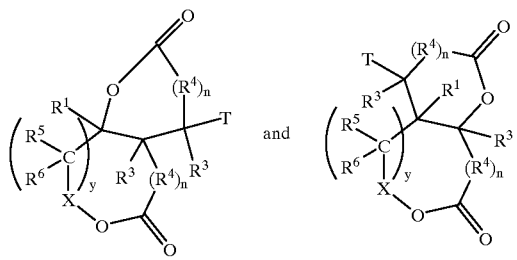

wherein each $R^1$ is H or a hydrocarbon based group, each $R^3$ is H or hydrocarbyl;

each $R^4$ is a divalent hydrocarbylene group;

each n=0 or 1; y=0 or 1; wherein X is a divalent hydrocarbyl group selected from the group consisting of

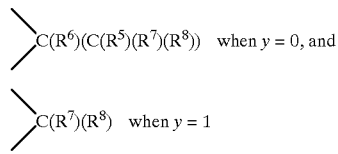

each $R^5$ is H or hydrocarbyl; and each of $R^6$, $R^7$ and $R^8$ is independently H or a hydrocarbon based group, and T is selected from the group consisting of —OH and $R^5$.

As noted hereinabove, the emulsifier compositions used in the present invention may be prepared by an alternative method, described in U.S. Pat. No. 5,739,356 in which the reaction product of the olefin (A) and the carboxylic reactant (B) is further reacted with an aldehyde or ketone (D).

The Catalyst

The first step in preparing the emulsifier compositions used in this invention is optionally conducted in the presence of an acidic catalyst. Acid catalysts, such as organic sulfonic acids, for example, paratoluene sulfonic acid, methane sulfonic acid and sulfonated polymers such as those marketed under the tradename AMBERLYST® (Rohm & Haas), heteropolyacids, the complex acids of heavy metals (e.g., Mo, W, Sn, V, Zr, etc.) with phosphoric acids (e.g., phosphomolybdic acid), and mineral acids, for example, $H_2SO_4$ and phosphoric acid, are useful. The amount of catalyst used is generally small, ranging from about 0.01 mole % to about 10 mole %, more often from about 0.1 mole % to about 2 mole %, based on moles of olefinic reactant.

(A) The Olefinic Compound

The olefinic compound employed as a reactant in the preparation of the emulsifier compositions used in this invention contains at least one group of the formula

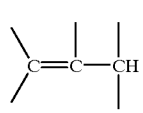

(I)

and has the general formula $(R^1)(R^2)C=C(R^6)(CH(R^7)(R^8))$ (II)

wherein each of $R^1$ and $R^2$ is, independently, hydrogen or a hydrocarbyl group, preferably a hydrocarbon based, group. Each of $R^6$, $R^7$ and $R^8$ is, independently, hydrogen or a hydrocarbyl, preferably a hydrocarbon based group; preferably at least one is a hydrocarbyl group containing at least 7 carbon atoms. These olefinic compounds are diverse in nature. In one preferred embodiment, $R^1$ and $R^2$ are both hydrogen, $R^7$ is hydrogen, $R^8$ is an aliphatic hydrocarbyl group, and $R^5$ is a methyl group.

Virtually any compound containing an olefinic bond may be used provided it meets the general requirements set forth hereinabove for (II) [and does not contain any functional groups (e.g., primary or secondary amines) that would interfere with the carboxylic reactant (B)]. Useful olefinic compounds may be terminal olefins, i.e., olefins having a $H_2C=C$ group, or internal olefins. Useful olefinic compounds may have more than one olefinic bond, i.e., they may be dienes, trienes, etc. Most often they are mono-olefinic. Examples include linear -olefins, cis- or trans-disubstituted olefins, trisubstituted olefins and tetrasubstituted olefins.

When (A) is a monoolefinic, one mole of (A) contains one equivalent of C=C; when (A) is diolefinic, one mole of (A) contains 2 equivalents of C=C bonds; when (A) is triolefinic, one mole of (A) contains 3 equivalents of C=C bonds, and so forth.

Aromatic double bonds are not considered to be olefinic double bonds within the context of this invention.

As used herein, the expression "polyolefin" defines a polymer derived from olefins. The expression "polyolefinic" refers to a compound containing more than one C=C bond.

Among useful compounds are those that are purely hydrocarbon, i.e., those substantially free of non-hydrocarbon groups, or they may contain one or more non-hydrocarbon groups as discussed in greater detail herein.

In one embodiment, the olefinic compounds are substantially hydrocarbon, that is, each R group in (II) is H or contains essentially carbon and hydrogen. In one aspect within this embodiment, each of $R^1I$, $R^2$, $R^7$ and $R^8$ is hydrogen and $R^6$ is a hydrocarbyl group containing from 7 to about 5,000 carbon atoms, more often from about 12 up to about 200 carbon atoms, often from about 30, preferably from about 50, up to about 100 carbon atoms. In another aspect of this embodiment, each of $R^1$ and $R^2$ is hydrogen, $R^6$ is H or a lower alkyl group, especially methyl, and the group $(CH(R^7)(R^8))$ is a hydrocarbyl group containing from 7 to about 5,000 carbon atoms, more typically from about 12 up to about 200 carbon atom, preferably from 30, often from about 50, up to about 100 carbon atoms.

As used here, and throughout the specification and claims, the expression "lower" with "alkyl", "alkenyl", etc. means groups having 7 or fewer carbon atoms, for example, methyl, ethyl and all isomers of propyl, butyl, pentyl, hexyl and heptyl, ethylene, butylene, etc.

In another embodiment, one or more of the R groups present in (II) is an organic radical which is not purely hydrocarbon. Such groups may contain or may be groups such as carboxylic acid, ester, and amide, cyano, hydroxy, thiol, tertiary amino, nitro, alkali metal mercapto and the like. Illustrative of olefinic compounds (II) containing such groups are methyl oleate, oleic acid, 2-dodecenedioic acid, octene diol, linoleic acid and esters thereof, and the like.

Preferably, the hydrocarbyl groups are aliphatic groups. In one preferred embodiment, when an R group is an aliphatic group containing a total of from about 30 to about 200 carbon atoms, the olefinic compound is derived from homopolymerized and interpolymerized $C_{2-18}$ mono- and di-olefins, preferably 1-olefins. Examples of such olefins are ethylene, propylene, butene-1, isobutylene, butadiene, isoprene, 1-hexene, 1-octene, etc. In a preferred embodiment, the olefins contain from 2 to about 5 carbon atoms, preferably 3 or 4 carbon atoms. R groups can, however, be derived from other sources, such as monomeric high molecular weight alkenes (e.g. 1-tetracontene), aliphatic petroleum fractions, particularly paraffin waxes and cracked analogs thereof, white oils, synthetic alkenes such as those produced by the Ziegler-Natta process (e.g., poly-(ethylene) greases) and other sources known to those skilled in the art. Any unsaturation in the R groups may be reduced by hydrogenation according to procedures known in the art, provided at least one olefinic group remains as described for (II).

In one preferred embodiment, at least one R is derived from polybutene, that is, polymers of $C_4$ olefins, including 1-butene, 2-butene and isobutylene. Those derived from isobutylene, i.e., polyisobutylenes, are especially preferred. In another preferred embodiment, R is derived from polypropylene. In another preferred embodiment, R is derived from ethylene-alpha olefin polymers, including ethylene-α-olefin-diene polymers, especially those wherein the diene is a non-conjugated diene. Representative of such polymers are the ethylene-propylene copolymers and ethylene-propylene-diene terpolymers marketed under the TRILENE® tradename by the Uniroyal Company. Molecular weights of such polymers may vary over a wide range, but especially preferred are those having number average molecular weights ($\overline{M}_n$) ranging from about 300 to about 20,000, preferably 700 to about 10,000, often from 900 to 2,500. In one preferred embodiment, the olefin is an ethylene-propylene-diene terpolymer having $\overline{M}_n$ ranging from about 900 to about 8,000, often up to about 2,000. Such materials are included among the Trilene® polymers marketed by the Uniroyal Company, Middlebury, Conn., U.S.A. and Ortholeum® 2052 marketed by the DuPont Company. Also contemplated are polydiene polymers, those prepared by polymerizing dienes.

Ethylene-alpha olefin copolymers and ethylene-lower olefin-diene terpolymers are described in numerous patent documents, including European patent publication EP 279,863, Japanese patent publication 87-129,303 and the following U.S. Pat. Nos.:

3,598,738 4,357,250
4,026,809 4,658,078
4,032,700 4,668,834
4,137,185 4,937,299
4,156,061 5,324,800
4,320,019 each of which is incorporated herein by reference for relevant disclosures of these ethylene based polymers A preferred source of hydrocarbyl groups R are polybutenes obtained by polymerization of a $C_4$ refinery stream having a butene content of 35 to 75 weight percent and isobutylene content of 15 to 60 weight percent in the presence of a Lewis acid catalyst such as aluminum trichloride or boron trifluoride. These polybutenes contain predominantly (greater than 80% of total repeating units) isobutylene repeating units of the configuration

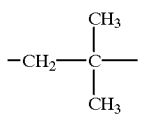

These polybutenes are typically monoolefinic, that is they contain but one olefinic bond per molecule.

The olefinic compound may be a polyolefin comprising a mixture of isomers wherein from about 50 percent to about 65 percent are tri-substituted olefins wherein one substituent contains from 2 to about 500 carbon atoms, often from about 30 to about 200 carbon atoms, more often from about 50 to about 100 carbon atoms, usually aliphatic carbon atoms, and the other two substituents are lower alkyl.

When the olefin is a tri-substituted olefin, it frequently comprises a mixture of cis- and trans- 1-lower alkyl, 1-(aliphatic hydrocarbyl containing from 30 to about 100 carbon atoms), 2-lower alkyl ethene and 1,1-di-lower alkyl, 2-(aliphatic hydrocarbyl containing from 30 to about 100 carbon atoms) ethene.

In one embodiment, the monoolefinic groups are predominantly vinylidene groups, i.e., groups of the formula

especially those of the formula

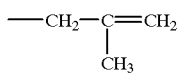

although the polybutenes may also comprise other olefinic configurations.

In one embodiment the polybutene is substantially monoolefinic, comprising at least about 30 mole %, preferably at least about 50 mole % vinylidene groups, more often at least about 70 mole % vinylidene groups. Such materials and methods for preparing them are described in U.S. Pat. Nos. 5,071,919; 5,137,978; 5,137,980; 5,286,823 and 5,408,018, and in published European patent application EP 646103-A1, each of which is expressly incorporated herein by reference. They are commercially available, for example under the tradenames ULTRAVIS® (BP Chemicals) and GLISSOPAL® (BASF).

In one embodiment, the olefinic compound is a polyolefin comprising a mixture of isomers, at least about 50% by weight of the mixture comprising isomers of the formula $$H_2C=C(R^6)(CH(R^7)(R^8))$$

wherein $R^6$ is H or lower alkyl, preferably methyl.

As is apparent from the foregoing, olefins of a wide variety of type and of molecular weight are useful for preparing the compositions of this invention. Useful olefins are usually substantially hydrocarbon and have number average molecular weight ranging from about 100 to about 70,000, more often from about 200 to about 7,000, even more often from about 1,300 to about 5,000, frequently from about 400 to about 3,000. Particularly preferred is where the olefinic compound contains from about 30 to about 200 carbon atoms, more often from about 50 to about 100 carbon atoms. Lower olefins such as those containing from about 7 to about 30 carbon atoms, for example, octenes, octadecenes, mixed olefin, such as $C_{8-28}$ linear olefins, are useful. Linear alpha-olefins containing from 7–100 carbon atoms, preferably from 8–50 carbons and often from 8 to about 28 carbon atoms are useful. In one typical embodiment, the olefinic compound contains from Specific characterization of olefin reactants (A) used in the processes of this invention can be accomplished by using techniques known to those skilled in the art. These techniques include general qualitative analysis by infrared and determinations of average molecular weight, e.g., $\overline{M}_n$, number average molecular weight, and $\overline{M}_w$, weight average molecular weight, etc. employing vapor phase osmometry (VPO) and gel permeation chromatography (GPC). Structural details can be elucidated employing proton and carbon 13 ($C^{13}$) nuclear magnetic resonance (NMR) techniques. NMR is useful for determining substitution characteristics about olefinic bonds, and provides some details regarding the nature of the substituents. More specific details regarding substituents about the olefinic bonds can be obtained by cleaving the substituents from the olefin by, for example, ozonolysis, then analyzing the cleaved products, also by NMR, GPC, VPO, and by infra-red analysis and other techniques known to the skilled person.

(B) The Carboxylic Reactant

The carboxylic reactant is at least one member selected from the group consisting of compounds of the formula $$R^3C(O)(R^4)_nC(O)OR^5 \qquad (III)$$

wherein each of $R^3$ and $R^5$ is independently H or a hydrocarbyl group, preferably H or lower alkyl, $R^4$ is a divalent hydrocarbylene group, and n is 0 or 1, and reactive sources thereof. Most preferably $R^3$ is H and $R^5$ are H and n=0.

Reactive sources include compounds of the formula

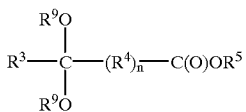
(IV)

wherein each of $R^3$ and $R^5$ and each $R^9$ is independently H or a hydrocarbyl group, $R^4$ is a divalent hydrocarbylene group, and n is 0 or 1. These include acetals, ketals, hemiacetals and hemiketals of (IV) and esters thereof. In one embodiment, both $R^9$ are hydrocarbyl, preferably alkyl, more preferably, lower alkyl, groups. Highly preferred are the compounds wherein one of $R^9$ is hydrocarbyl, preferably lower alkyl, and one is H:

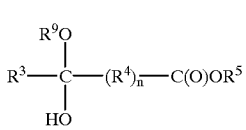
(V)

wherein each of $R^3$ and $R^5$ is independently H or a hydrocarbyl group, especially wherein the hydrocarbyl group is lower alkyl. $R^4$ is a divalent hydrocarbylene group, preferably lower alkylene, and n is 0 or 1, preferably 0. Especially preferred are the glyoxylate lower alkyl ester, lower alkyl hemiacetals. Cyclic trimers are useful.

The carboxylic reactant may be a compound of the formula

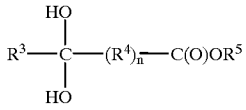
(VI)

wherein each of $R^3$ and $R^5$ is independently H or alkyl. Such compounds may arise when the carboxylic acid or ester reactant is hydrated.

$R^3$ is usually H or an aliphatic group, that is, alkyl or alkenyl, preferably alkyl, more preferably lower alkyl. Especially preferred is where $R^3$ is H or methyl, most preferably, H.

$R^4$ is a divalent hydrocarbylene group. This group may be aliphatic or aromatic, but is usually aliphatic. Often, $R^4$ is an alkylene group containing from 1 to about 3 carbon atoms. The 'n' is 0 or 1; that is, in one embodiment $R^4$ is present and in another embodiment, $R^4$ is absent. More often, $R^4$ is absent.

When $R^5$ is hydrocarbyl, it is usually an aliphatic group, often a group containing from 1 to about 30 carbon atoms, often from 8 to about 18 carbon atoms. In another embodiment, $R^5$ is lower alkyl, wherein "lower alkyl" is defined hereinabove. Most often, $R^5$ is H or lower alkyl, especially methyl, ethyl, propyl and butyl.

Examples of carboxylic reactants are glyoxylic acid, and other omega-oxoalkanoic acids, glyoxylic acid hydrate, keto alkanoic acids such as pyruvic acid, levulinic acid, ketovaleric acids, ketobutyric acids, esters thereof, preferably the lower alkyl esters, methyl glyoxylate methyl hemiacetal, 4-formylbenzoic acid, 4-formylphenoxyacetic acid, esters thereof, carboxy benzaldehyde, the hemiacetals and hemiketals of keto- or aldehydoalkanoic acids such as glyoxylic acid and keto alkanoic acids such as pyruvic acid, levulinic acid, ketovaleric acids, and ketobutyric acids, and the corresponding acetals and ketals, and numerous others. The skilled worker, having the disclosure before him, will readily recognize the appropriate carboxylic reactant (B) to employ to generate a given intermediate. Preferred carboxylic reactants are those that will lead to preferred products of this invention.

Preferred (B) reactants are lower alkyl glyoxylate, lower alkyl hemiacetals. In an especially preferred embodiment, $R^3$ and one $R^9$ are hydrogen and the other $R^9$ and $R^5$ are methyl. In this especially preferred embodiment, the reactant is represented by the structure

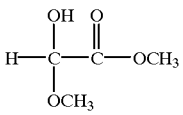

and is known as glyoxylic acid methyl ester methylhemiacetal. It is marketed by DSM Fine Chemicals.

(D) The Aldehyde or Ketone

The aldehyde or ketone reactant which may optionally be employed in the preparation of the emulsifier compositions used in this invention is a carbonyl compound other than a carboxy-substituted carbonyl compound. Accordingly, it is to be understood that it is not contemplated herein that reactant (D) includes any of the species defined hereinabove as reactant (B). Suitable compounds include those having the general formula RC(O)R', wherein R and R' are each, independently, H or a hydrocarbyl group as defined hereinabove. As noted in the description, hydrocarbyl groups may contain other groups or heteroatoms which do not interfere with the process and products of this invention. Preferably, reactant (D) contains from 1 to about 12 carbon atoms. Suitable aldehydes include formaldehyde, acetaldehyde, propionaldehyde, butyraldehyde, isobutyraldehyde, pentanal, hexanal, heptaldehyde, octanal, benzaldehyde, and higher aldehydes. Other aldehydes, such as dialdehydes, especially glyoxal, are useful, although monoaldehydes are generally preferred.

The most preferred aldehyde is formaldehyde, which can be supplied as the aqueous solution often referred to as formalin, but is more often used in the polymeric form as paraformaldehyde, which is a reactive equivalent of, or a source of, formaldehyde. Other reactive equivalents include hydrates or cyclic trimers.

Suitable ketones include acetone, butanone, methyl ethyl ketone, and other ketones. Preferably, one of the hydrocarbyl groups is methyl.

Mixtures of two or more aldehydes and/or ketones are also useful.

The process comprising reacting (A), (B) and optionally, (D) is conducted at temperatures ranging from ambient up to the lowest decomposition temperature of any of the reactants, usually from about 60° C. to about 220° C., more often from about 120° C. to about 180° C., preferably up to about 160° C. When the reaction is conducted in the presence of organic sulfonic acid or mineral acid catalyst, the reaction is usually conducted at temperatures up to about 160° C. The process employs from about 0.6 moles of reactant (B) per mole of olefinic compound (A), up to 3 moles (B) per equivalent of (A). In one embodiment the process employs from about 0.8 moles (B) per mole of (A) to about 1.2 moles (B) per equivalent of (A), even more often from about 0.95 moles (B) per mole of (A) to about 1.05 moles (B) per equivalent of (A). In another embodiment the process employs more than 1.5 moles, preferably from about 1.6 to about 3 moles of reactant (B) per equivalent of reactant (A), more often from about 1.8 to about 2.5 moles of (B) per equivalent of (A) and preferably from about 1.9 to about 2.1 moles (B) per equivalent of (A). Removal of distillate, either from reactants or which is generated during reaction, at moderate temperatures is attainable employing reduced pressure, a solvent that aids in azeotropic distillation, or by purging with an inert gas such as $N_2$.

The progress of the first part of the reaction to prepare the intermediate can be followed by observing the infra-red spectrum. The absorption for COOH carbonyl of the products appears at about 1710 $cm^{-1}$. The total acid number as measured using essentially the procedure in ASTM D-664 (Potentiometric Method) or ASTM D-974 (Color Indicator Method) is useful together with the infrared, keeping in mind that non-acidic products (e.g., polyester products), those derived from non-acidic reactants and condensation products such as lactones will not display significant acid numbers.

These ASTM procedures appear in the Annual Book of ASTM Standards, Volume 05.01, ASTM, 1916 Race Street, Philadelphia, Pa., U.S.A.

(C) Amine Reactants Suitable (C) reactants, as defined herein, include monoamines and polyamines. The (C) reactants must contain at least one N-H group. Thus, only primary and secondary amines are used in preparing the emulsifiers of this invention. Polyamines may be used provided that they contain at least one primary or secondary amine group. The monoamines generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc.

In another embodiment, the monoamine may be a hydroxyamine. Typically, the hydroxyamines are primary or secondary alkanolamines or mixtures thereof. Alkanol amines that can react to form amide can be represented, for example, by the formulae:

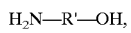

and

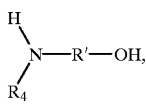

wherein each $R_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R^4$ is independently a methyl, ethyl, propyl, butyl, pentyl or hexyl group.

Examples of these alkanolamines include mono- and di-ethanolamine, ethylethanolamine, monomethylethanolamine, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxyhydrocarbyl) amines can be conveniently prepared, for example, by reaction of epoxides with aforedescribed amines and can be represented by the formulae:

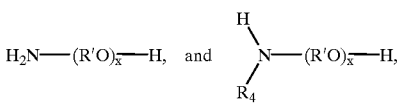

wherein x is a number from about 2 to about 15 and $R_4$ and R' are as described above. $R_4$ may also be a hydroxypoly (hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or alkyl, more preferably H. When $R_7$ is not H, then it preferably is alkyl containing from one to about 24 carbon atoms. Especially preferred ether amines are those available under the name SURFAM produced and marketed by Sea Land Chemical Co., Westlake, Ohio.

The amine may also be a polyamine. The polyamine may be aliphatic, cycloaliphatic, heterocyclic or aromatic. Examples of the polyamines include alkylene polyamines, hydroxy containing polyamines, polyoxyalkylene polyamines, arylpolyamines, and heterocyclic polyamines.

Alkylene polyamines are represented by the formula

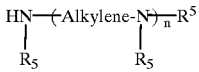

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_5$ is independently hydrogen or an aliphatic or hydroxy-substituted aliphatic group of up to about 30 carbon atoms. Preferably $R_5$ is H or lower alkyl, most preferably, H.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, N,N- dimethylaminopropylamine, trimethylene diamine, tripropylene tetramine, tetraethylene pentamine, hexaethylene heptamine, pentaethylenehexamine, aminoethyl piperazine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading "Diamines and Higher Amines" in Kirk Othmer's "Encyclopedia of Chemical Technology", 4th Edition, Vol. 8, pages 74–108, John Wiley and Sons, New York (1993) and in Meinhardt, et al, U.S. Pat. No. 4,234,435, both of which are hereby incorporated herein by reference for disclosure of useful polyamines. Such polyamines are most conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably diethylenetriamine), 0.72% triethylenetetramine, 21.74% tetraethylenepentamine and 76.61% pentaethylene hexamine and higher (by weight). These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl) amine, tris-(hydroxymethyl)amino methane, 2-amino-2-methyl- 1,3-propanediol, N,N,N',N'-tetrakis(2-hydroxypropyl) ethylenediamine, and N,N,N',N'-tetrakis(2-hydroxyethyl) ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making amine condensates.

In another embodiment, the polyamines are hydroxy-containing polyamines. Hydroxy-containing polyamine analogs of hydroxy monoamines, particularly alkoxylated alkylenepolyamines can also be used. Such polyamines can be made by reacting the above-described alkylene amines with one or more of the above-described alkylene oxides. Similar alkylene oxide-alkanolamine reaction products can also be used such as the products made by reacting the aforedescribed primary, secondary or tertiary alkanolamines with ethylene, propylene or higher epoxides in a 1:1 to 1:2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, 1-(2-hydroxyethyl) piperazine, mono-(hydroxypropyl)-substituted tetraethylenepentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

The polyamines may be polyoxyalkylene polyamines, including polyoxyethylene and polyoxypropylene diamines and the polyoxypropylene triamines having average molecular weights ranging from about 200 to about 2000. Polyoxyalkylene polyamines, including polyoxyethylene-polyoxypropylene polyamines, are commercially available, for example under the tradename "Jeffamines" from Texaco Chemical Co. U.S. Pat. Nos. 3,804,763 and 3,948,800 contain disclosures of polyoxyalkylene polyamines and are incorporated herein by reference for their disclosure of such materials.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkylthiomorpholines, N-aminoalkylmorpholines, N-aminoalkyl-piperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkyl substituted piperidines, piperazine, aminoalkylsubstituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-amino-ethylpiperazine, and N,N'-diaminoethyl-piperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly (ethylene/propylene)amine, (50:50 mole ratio of monomers); polybutene amine; N,N-di(hydroxyethyl)-N-polybutene amine; N-(2-hydroxypropyl)-N-polybutene amine; N-polybutene-aniline; N-polybutene-morpholine; N-poly(butene) ethylenediamine; N-poly(propylene)trimethylenediamine; N-poly(butene)diethylene-triamine; N',N'-poly(butene) tetraethylenepentamine; N,N-dimethyl-N'-poly-(propylene)-1,3-propylenediamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by an n (number average molecular weight) value of at least about 500. Generally, the polyalkene substituted amine is characterized by an n value of about 500 to about 5000, preferably about 800 to about 2500. In another embodiment n varies between about 500 to about 1200 or 1300.

The polyalkenes from which the polyalkene substituted amines are derived include homopolymers and interpolymers of polymerizable olefin monomers of 2 to about 16 carbon atoms; usually 2 to about 6, preferably 2 to about 4, more preferably 4. The olefins may be monoolefins such as ethylene, propylene, 1-butene, isobutene, and 1-octene; or a polyolefinic monomer, preferably diolefinic monomer, such 1,3-butadiene and isoprene. Preferably, the polymer is a homopolymer. An example of a preferred homopolymer is a polybutene, preferably a polybutene in which about 50% of the polymer is derived from isobutylene. The polyalkenes are prepared by conventional procedures.

It is generally preferred to utilize sufficient amine reactant (C) to convert substantially all of the intermediate arising from reaction of (A) with (B) to product; however, conversion of at least 50%, more preferably 75% is often acceptable. Preferably, at least 90%, more preferably 99–100% conversion is effected.

The reaction with the (C) reactant to prepare the products of this invention is conducted at temperatures ranging from about 25° C. to about 230° C., preferably from about 130° C. to about 160° C. and when the amine is an alkanolamine, an alkylene polyamine or a thioalkanol amine, N-containing heterocyclic group containing products such as imidazoline, oxazoline, or thiazoline formation may form. These are frequently obtained by first preparing an amide then continuing the reaction at elevated temperature to generate imidazoline, thiazoline or oxazoline by removal of water.

Imidazoline formation will not occur with every amine; the amine must have the structural element:

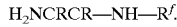

Similarly, oxazoline formation can take place when the amine is a β-hydroxyethyl amine, e.g.,

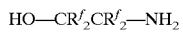

β-thiolamines can react to form thiazolines.

In the above formulae, each $R^f$ is independently H, alkoxyalkyl, hydroxyalkyl, hydrocarbyl, aminohydrocarbyl or N-alkoxyalkyl- or hydroxyalkyl-substituted amino hydrocarbyl.

Thus, if imidazoline, thiazoline or oxazoline formation is not desired, they may be avoided by employing amine reactants that do not provide the opportunity for imidazoline, thiazoline or oxazoline formation, or, if the amine employed can lead to oxazoline, thiazoline or imidazoline, to minimize formation thereof by conducting the reaction at the lowest temperature to prepare amide at an acceptable rate and in acceptable amounts, or to avoid prolonged heating of the amide-containing product, once it has formed. Infrared analysis during the reaction is a convenient means for determining the nature and extent of the reaction.

To prepare the carboxylic acid derivative emulsifier compositions from the acylating agent and amine, one or more acylating agents and one or more amines are heated, optionally in the presence of a normally liquid, substantially inert organic diluent, at temperatures in the range of about 30° C. up to the decomposition point of the reactant or product having the lowest such temperature, but normally at temperatures in the range of from about 50° C. up to about 300° C., provided 300° C. does not exceed the decomposition point. Temperatures up to about 200° C. can be used.

Procedures for preparing the derivatives used as emulsifiers are the same as those outlined in numerous U.S. Patents, for example U.S. Pat. Nos. 3,172,892; 3,272,746; and 4,234,435, and particularly 5,696,060; 5,696,067; and 5,779,742, and PCT publication WO98/05741, all of which are expressly incorporated herein by reference for relevant disclosures in this regard.

In one embodiment, the acylating agent is reacted with from about 0.5 to about 3, preferably 0.5 to about 2, more preferably about 0.5 to about 1.5, even more preferably about 0.8 to about 1.2 equivalents of amine per equivalent of acylating agent. In other embodiments, even greater amounts of amine may be used.

The number of equivalents of acylating agent depends on the total number of carboxylic functions present. In the determination of the number of equivalents of acylating agent, carboxyl functions which are not capable of reacting as a carboxylic acid acylating agent are excluded. In general, there is one equivalent of acylating agent for each carboxy group in the acylating agents. For example there are two equivalents in the regioisomers derived from more than 1.5 moles carboxylic reactant per mole of olefinic compound. Conventional methods for determining the number of carboxyl functions (e.g., acid number, saponification number, etc.) are available and are well known to those skilled in the art.

An equivalent weight of monoamine is the molecular weight of the amine. The equivalent weight of mixtures of monoamines can be determined by dividing the atomic weight of nitrogen (14) by the % N contained in the mixture and multiplying by 100. Equivalent weight of polyamines can be determined similarly.

The Emulsions

The emulsifier compositions of the present invention are particularly useful in preparing oil continuous phase emulsions, that is, water-in-oil emulsions in which there are high levels of active components in the dispersed aqueous phase. The water-in-oil emulsions have the bulk characteristics of the continuous oil phase even though on a volume basis, the aqueous phase may be the predominant phase.

The inventive water-in-oil emulsions, which are useful as fertilizers, comprise a discontinuous aqueous phase, a continuous organic phase, and a minor emulsifying amount of at least one emulsifier.

Water-in-oil emulsions generally contain at least 2% by weight of the continuous oil phase. More preferably, they contain between about 2% to about 10% by weight of the continuous oil phase, and most preferably, in the range from about 3.5 to about 8% by weight of the oil phase. The discontinuous aqueous phase is preferably present at a level of at least about 90% by weight, more preferably from about 90% to about 98% by weight and most preferably from about 92 to about 96.5% by weight based on the total weight of the emulsion. The emulsifier compositions are generally present in amounts ranging from about 4% to about 40% by weight, more preferably from about 12 to 20% by weight based upon the total weight of the organic phase. The fertilizer component or components are preferably present in amounts ranging from about 70% to about 95% by weight, more preferably from about 85% to about 92% by weight, more preferably from about 87% to about 90% by weight based on the total weight of the aqueous phase. Water is preferably present in amounts ranging from about 5% to about 30% by weight, more preferably from about 8% to about 15% by weight, and more preferably from about 10% to about 13% by weight based on the total weight of the aqueous phase.

The fertilizer emulsions may be prepared by dissolving the emulsifier in the organic phase and adding the aqueous phase with stirring. The aqueous phase is prepared by dissolving the fertilizer compositions in water. Only moderate shear mixing is needed. Both stirred and static mixers may be used to prepare the emulsions.

The Organic Phase

The emulsion compositions of this invention comprise an organic phase which is often an oil or a wax. The oil serves to protect fertilizer components, which are in the aqueous phase, and control their release to the environment. The organic phase that is useful in the emulsion fertilizer compositions of the present invention typically comprises a carbonaceous material and can include oils from a variety of sources, including natural and synthetic oils and mixtures thereof. Hydrocarbon oils, for example, paraffinic, olefinic, naphthenic, aromatic, saturated or unsaturated hydrocarbons, may be used. In general, the oil is water-immiscible, emulsifiable and is either liquid at about 20° C. or becomes a liquid or is liquefiable at a temperature below about 95° C., especially between about 40° C. and 75° C. and preferably below about 60° C. Oils from a variety of sources, including natural and synthetic oils, may be used.

Natural oils include animal oils and vegetable oils (e.g., castor oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl) benzenes, etc.); polyphenyls (e.g., biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like.

Esters useful as synthetic oils also include those made by reacting C5 to C24 monocarboxylic acids mono alcohols or polyols. The mono alcohols include C1 to C18 aliphatic alcohols. Polyols include neopentyl glycol, trimethylol propane, pentaerythritol, dipentaerythritol, tripentaerythritol, and polyol ethers.

Silicon-based oils and silicate oils comprise another class of useful oils. Also useful are the liquid esters of phosphorous-containing acids, polymeric tetrahydrofurans, and the like.

Unrefined, refined and rerefined oils and mixtures of thereof can be used. Unrefined oils are those obtained directly from a natural or synthetic source without further purification treatment. For example, a shale oil obtained directly from a retorting operation, crude oil obtained directly from an oil well, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils may be used as the oil phase. Such rerefined oils are also known as reclaimed or reprocessed oils and often are obtained by processes similar to those used to obtain ordinary refined oils. These rerefined oils may be additionally processed by techniques directed toward removal of spent additives and oil breakdown products.

Examples of useful oils include a white mineral oil available from Witco Chemical Company under the tradename KAYDOL; a white mineral oil available from Shell under the tradename ONDINA; and a mineral oil available from Pennzoil under the tradename N-750-HT. Diesel fuel oil (e.g., Grade No. 2-D) as specified in ASTM D-975, Standard Specification for Diesel Fuel Oils, can be used.

Also useful are waxes having melting points of at least about 25° C., such as petrolatum wax, microcrystalline wax, and paraffin wax; mineral waxes such as ozoceite and montan wax; animal waxes such as spermaceti wax, and insect waxes such as beeswax and Chinese wax. Useful waxes include those identified by the tradenames MOBIL-WAX 57, available from Mobil Oil Corporation, D02764, a blended wax available from Astor Chemical Ltd., and VYBAR, available from Petrolite Corporation. Preferred waxes are blends of microcrystalline waxes and paraffin.

In one embodiment, the organic phase comprises a combination of a wax and an oil. The wax content can be at least about 25% and preferably is at least about 25% up to about 90% by weight of the organic phase, and the oil content can be at least about 10% and preferably ranges from about 10% to about 75% by weight of the organic phase.

As noted above, the biodegradability of the oil phase is particularly important in fertilizer compositions. Thus, more biodegradable mineral oils are preferred over less biodegradable heavy oils. Vegetable oils are especially preferred because of their biodegradability and ready availability.

Examples of useful vegetable oils include babbasu, palm, castor, olive, peanut, rapeseed, corn, sesame, coconut, cottonseed soybean, linseed, sunflower, and safflower. It has been found that vegetable oils, in general form emulsions which release fertilizer components more quickly than emulsions prepared from mineral oils. Accordingly, the type of oil used to prepare the emulsions may also be used to control the rate of release of the fertilizer components. For example, pure vegetable oils and mixtures of vegetable oil and mineral oil may be used to obtain the desired rate of release.

The continuous organic phase is preferably present at a level of at least about 2% by weight, more preferably in the range of from about 2% to about 15% by weight, more preferably in the range of from about 3.5% to about 8% by weight based on the total weight of the fertilizer emulsion. The discontinuous fertilizer phase is preferably present at a level of at least about 85% by weight, more preferably at a level in the range of from about 85% to about 98% by weight, more preferably from about 92% to about 96.5% by weight based on the total weight of said fertilizer emulsion.

The Fertilizer Component

Water soluble fertilizer components include the major fertilizer components which supply the nutrients nitrogen, phosphorus and potassium. Optionally, various components to supply specialized nutrients may be included. Thus, if a particular soil is deficient in a trace element, a useable form of this element may be included in the emulsion. Examples of such trace elements include boron, iron, manganese, sulfur, zinc, copper and molybdenum. These may be supplies as their salts or in other useable form. If the salts are insoluble, they may be incorporated into the aqueous phase, and if insoluble, may be suspended in the emulsion. Among the major components, nitrogen may be supplied by organic material such as urea, guanidine and salts thereof, and by inorganic materials such as ammonium nitrate and alkali and alkaline earth metal nitrates. Potassium may be supplied by potassium salts such as carbonate, chloride, nitrate, phosphate, pyrophosphate, and sulfate. Phosphorus may be supplied by alkali and alkaline earth metal phosphates.

The fertilizer compositions may include solid fertilizer components suspended in the emulsion. The suspended components may include any of the water soluble fertilizer components noted above. Since these components are suspended in the emulsion, but are not protected by the continuous oil phase, they will be released rather quickly. By this means, a fertilizer composition may be prepared which provides for early release of some components and delayed release of the rest. For example, a fertilizer can be prepared which releases some nitrogen early and delays release of the rest. Such a composition could provide a fertilizer dosage in one application which would normally require two applications of conventional fertilizer. In addition, soil conditioning components which are insoluble in water could be suspended in the fertilizer emulsion. For example, powdered limestone could be suspended in the fertilizer to correct the pH balance of the soil.

The following examples illustrate the emulsifier compositions used in preparation of the emulsions of this invention. These examples are intended to be illustrative only and are not intended to limit the scope of the invention. Unless indicated otherwise, all parts are parts by weight and temperatures are in degrees Celsius. All analytical values are by analysis. Unreacted polyolefin is determined by thin layer chromatography-flame ionization detector (TLC-FID). Filtrations employ a diatomaceous earth filter aid.

Example 1A

A reactor is charged with 807 parts of polyisobutene having $M_n$ about 940, 300 parts cyclohexane, 4 parts 70% aqueous methane sulfonic acid, and 167 parts 50% aqueous glyoxylic acid. The materials are heated to reflux (95–110° C.) and maintained at reflux for 10 hours, collecting 80 parts by volume aqueous distillate in a Dean-Stark trap. The materials are vacuum stripped then filtered. The product has saponification no.=60.6 and contains 20.2% unreacted polyisobutylene (TLC-FID).

Example 1B

A reactor is charged with 89.8 parts of the product of Example 1A which is then heated to 85° C. Heating is discontinued and 10.2 parts diethanolamine are added over 0.3 hour at 82–86° C. Heating is resumed and the temperature is increased to 109° C. The materials are heated for 1.5 hour at 106–115° C. then temperature is increased to 138° C. The temperature is maintained at 138–140° C. for 4.8 hours, is increased to 150° C. and is maintained for 2 hours. The product has 1.36% N.

Example 2A

A reactor is charged with 3000 parts of a polyisobutene having a number average molecular weight of about 1000 and which contains about 80 mole % terminal vinylidene groups and 6 parts 70% aqueous methanesulfonic acid. The materials are heated to 160° C. under $N_2$ followed by addition of 577.2 parts 50% aqueous glyoxylic acid over 4 hours while maintaining 155–160° C. Water is removed and is collected in a Dean-Stark trap. The reaction is held at 160° C. for 5 hours, cooled to 140° C. and filtered. The filtrate has total acid no. (ASTM Procedure D-974)=34.7 and saponification no. (ASTM Procedure D-74)=53.2. $\overline{M}_n$ (Gel permeation chromatography (GPC))=1476 and $\overline{M}_w$ (GPC)=3067; unreacted polyisobutene (TLC-FID))=8.6%.

Example 2B

A reactor is charged with 300 parts of the intermediate of Example 2A and 34.1 parts of aminoethylpiperazine. The materials are mixed while heating, under $N_2$, to 160° C. and are held at temperature for 5 hours, stripped to 160° C. and 35 mm Hg, cooled to 100° C., mixed with 143.2 parts aromatic hydrocarbon and filtered. The filtrate contains 2.06% N and 0.28% free amine.

Example 3

A reactor is charged with 250 parts of an intermediate prepared essentially according to the procedure of Example 2A and 24.6 parts diethylene triamine. The materials are mixed while heating, under $N_2$, to 160° C. and are held at temperature for 5 hours, stripped to 160° C. and 25 mm Hg, cooled to 130° C., mixed with 91.5 parts aromatic hydrocarbon diluent and the solution is filtered. The filtrate contains 2.01%N.

Example 4A

A reactor is charged with 4000 parts polyisobutylene (Ultravis 10, BP Chemicals) having $\overline{M}_n$ about 1000 and containing about 80 mole % terminal vinylidene groups, 592 parts 50% aqueous glyoxylic acid, 132 parts paraformaldehyde and 16 parts 70% aqueous methanesulfonic acid. The materials are heated to 120° C. over 0.75 hour then to 160° C. over 2.5 hours, collecting water, then reacted at 160° C. for a total of 6 hours; total water collected, 475 parts. The materials are stripped to 160° C. and 40 mm Hg and filtered. The filtrate contains 19.9% unreacted polyisobutylene, has saponification no.=42 and (GPC) $\overline{M}_n$=1419, $\overline{M}_w$=3272.

Example 4B

A reactor is charged with 200 parts of the product of Example 4A and 19.3 parts aminoethylpiperazine. The materials are heated to 160° C., under $N_2$, and held at temperature for 5 hours. The materials are stripped to 160° C. at 25 mm Hg, cooled to 130° C. whereupon 73.1 parts aromatic diluent are added. The materials are filtered. The filtrate contains 2% N.

Example 5A

A reactor is charged with 1360 parts polyisobutene (Glissopal ES3250) having $_n$ about 1000 and containing about 87 mole percent terminal vinylidene groups, 250 parts glyoxylic acid monohydrate and 1.35 parts 70% aqueous methane sulfonic acid. The materials are heated under $N_2$ for 4 hours at 155°–160° C. while collecting 82 parts aqueous distillate in a Dean-Stark trap. The materials are filtered at 155°–160° C. with a diatomaceous earth filter aid. Infra red spectrum: very strong lactone C=O at 1774 cm$^{-1}$. Saponification No.+107; Total acid no+31.8, 9% unreacted polyisobutene (TLC-FID).

Example 5B

A reactor is charged with 250 parts of a product prepared as in Example 5SA, and 61.4 parts aminoethylpiperazine. The materials are heated, under $N_2$; to 180° C. and are held at temperature for 7 hours followed by heating to 200° C. and heating at temperature for 5.5 hours. An additional 3.1 parts aminoethylpiperazine is added, the temperature is increased to 210° C. and the materials are heated at temperature for 2 hours, cooled to 115° C. and stripped at 115° C. 25 mm Hg, cooled to 130° C. whereupon 73.1 parts aromatic The materials are dissolved in 103.5 parts aromatic solvent and are filtered at 120° C. Filtrate contains 4.33% N.

Example 6A

A reactor is charged with 1200 parts of polyisobutylene (Glissopal ES3250, BASF) having $\overline{M}_n$ about 1000 and containing about 87 mole percent terminal vinylidene groups, 177.6 parts of 50% aqueous glyoxylic acid, 36 parts paraformaldehyde and 4.8 parts 70% aqueous methanesulfonic acid. The materials are heated with mixing under $N_2$, to 160° C. and are held at temperature for 5.5 hours, collecting 114 parts water. The materials are cooled to 100° C. and stripped to 140° C. and 20 mm Hg and filtered. The filtrate has saponification no=44 and has (VPO) $\overline{M}_n$=1852.

Example 6B

A reactor is charged with 200 parts of the product of Example 6A and 17.1 parts of ethanolamine. The materials are heated with stirring, under $N_2$, to 160° C., held at 160° C. for 6 hours, cooled and stripped to 130° C. at 25 mm Hg and filtered. The filtrate contains 1.30% N and 0% free amine.

Example 7A

A reactor is charged with 1500 parts of Ultravis 10, 3 parts 70% aqueous methanesulfonic acid, and 0.05 part silicone antifoam agent. The materials are heated to 160° C. To the heated mixture are added 289.6 parts 50% aqueous glyoxylic acid over 3.5 hours while collecting aqueous distillate in a Dean-Stark trap. The materials are heated at 160° C. for 6.75 hours then cooled to 140° C. and filtered. Saponification no=49.9; unreacted polyisobutylene=13.2% (TLC-FID).

Example 7B

A reactor is charged with 300 parts of the product of Example 7A, 41.6 parts triethanolamine, 0.75 part 70% aqueous methanesulfonic acid, and 227.7 parts mineral oil. The materials are heated to 100° C. and the temperature is maintained, under $N_2$, for 2.5 hours. The temperature is increased to 120° C. and is maintained for 3 hours followed by heating to 150° where the temperature is maintained for 4.75 hours. The materials are filtered at 100° C. The filtrate contains 0.5% N.

Example 8

A reactor is charged with 300 parts of the product of Example 7A, 29.3 parts diethanolamine, and 219.5 parts mineral oil. The materials are heated, under $N_2$, to 160° C. and is maintained for 15.25 hours. The materials are filtered at 100° C. The filtrate contains 0.65% N.

Example 9

A reactor is charged with 253 parts of the product of Example 7A, 37 parts ethanolamine, 1 part 70% aqueous methanesulfonic acid, and 192.5 parts mineral oil. The materials are heated, under $N_2$, to 80° C. and is held at temperature for 3.75 hours. The temperature is increased to 120° C. and is maintained for 6.5 hours then is increased to 160° C. where it is held for 3.75 hours. The materials are striped at 150° C. and 30 mm Hg pressure. The residue is filtered at 100° C. The filtrate contains 1.09% N.

Example 10A

A reactor is charged with 1510 parts of the polyisobutylene used in Example 1A, 216.1 parts glyoxylic acid methyl ester methylhemiacetal (GMHA), and 6.4 parts 70% aqueous methanesulfonic acid. The materials are heated under $N_2$ at 135° C. for 5.5 hours, cooled to 90° C. and stripped under vacuum. The temperature is increased to 115° C. and is held there for 1 hour. The product has saponification no. of 52.8 and contains 22% unreacted polyisobutylene(TLC-FID).

Example 10B

A reactor is charged with 396 parts of the product of Example 10A and 45.6 parts of diethanolamine. The materials are stirred and heated for a total of 7.5 hours. Product contains 1 .30%N.

Example 11

The procedure of Example 10B is followed with 326.4 parts of the product of Example 10A and 22 parts of monoethanolamine. The product contains 1.31% N.

Example 12A

A reactor is charged with 2132.7 parts of the polyisobutylene used in Example 1A, 310.1 parts glyoxylic acid methyl ester methylhemiacetal (GMHA), and 8.4 parts 70% aqueous methanesulfonic acid. The materials are heated under $N_2$ at 130° C. for 6 hours. The materials are filtered at 60° C. The product has saponification no. of 63.7.

Example 12B

A reactor is charged with 154.3 parts of the product of Example 12A and 17.9 parts of dimethylaminopropylamine. The materials are heated at 100° C. for a total of 7 hours then at 130° C. for a total of 6 hours. The product contains 1.99% N.

Example 13

A reactor is charged with 294.4 parts of the product of Example 12A and 48.5 parts of aminopropylmorpholine. The materials are heated at 100° C. for 1 hour then at 130° C. for a total of 7 hours. The product contains 2.46% N.

Example 14

A reactor is charged with 296.1 parts of the product of Example 12A and 49.7 parts of methylene glycol diamine (Jeffamine EDR-148, Texaco Chemicals, Bellaire, Tex.). The materials are heated at 130° C. for a total of 9.5 hours. The product contains 2.53% N.

Method of Making the Emulsions

A useful method for making the emulsions of the invention comprises the steps of (1) mixing water, fertilizer components and, in certain cases, a supplemental water-soluble compounds, in a first premix, (2) mixing the organic material, such as oil, the emulsifier of the invention and any other optional oil-soluble compounds, in a second premix and (3) adding the first premix to the second premix in a suitable mixing apparatus, to form a water-in-oil emulsion. The first premix is heated until all the salts are completely dissolved and the solution may be filtered if needed in order to remove any insoluble residue. The second premix is also heated to liquefy the ingredients. Any type of apparatus capable of either low or high shear mixing can be used to prepare these water-in-oil emulsions.

The emulsifiers of this invention can be used per se to prepare the inventive emulsions. They can also be diluted with a substantially inert, normally liquid organic diluent such as mineral oil, naphtha, benzene, toluene or xylene, to form an additive concentrate. These concentrates usually contain from about 10% to about 90% by weight of the emulsifier composition of this invention and may contain, in addition, one or more other additives known in the art or described herein.

The following examples illustrate emulsions of this invention and procedures for preparing them. Unless otherwise indicated, all parts are parts by weight (pbw).

Example A

In a container at 82° C. a mixture of 47 parts ammonium nitrate, 42.30 parts urea and 4.7 parts water are melted. To another container are added 1.25 parts 2 cSt polyalphaolefin oil, 3.75 parts rapeseed oil and 1 part of the product of Example 10B. While mixing at 500 rpm using a Heidolf mixer, the aqueous solution is added over 2 minutes to the oil solution forming an emulsion. The speed of the mixer is increased to 700 rpm and the emulsion is mixed for another 2 minutes to provide the desired emulsion fertilizer composition. Emulsion viscosity is determined using a Brookfield viscometer @ room temperature, essentially according to ASTM Procedure D-2196. At 10 rpm viscosity is 75,000 centipoise; at 20 rpm viscosity is 44,600 centipoise.

The release characteristics of the emulsion are tested. There is no generally accepted method for testing the release characteristics of emulsion fertilizers. However, the method of measuring the release characteristics of a delayed release fertilizer described in U.S. Pat. Nos. 5,512,079 and 5,518,517 is used to measure the rate of release of fertilizer components. According to this method, the emulsion is prepared and a 1.7 gram sample is taken and placed as one lump, in a stoppered 250 ml. Erlenmeyer flask, 100 ml water are added and the mixture is maintained at 30° C. The flask is shaken on a Lab-Line @ Orbit Environ orbital shaker at 200 rpm. Samples of the aqueous phase are withdrawn on a weekly basis and analyzed by conductivity for the fertilizer component contained in the emulsion. After each analysis for the amount of fertilizer component leached from the emulsion, the aqueous sample is returned to the flask and shaking is continued. The following data are obtained for the emulsion of Example A:

Weeks % Leached
1 38.55
2 69.31
3 91.40

Comparative Example

A fertilizer composition is prepared as in Example A except the product of Example 10B is replaced with a like amount of an emulsifier prepared as follows:

A mixture is prepared from 43.3 parts polyisobutenyl ($M_n$~950) succinic anhydride, 13.6 parts hexadecenyl succinic anhydride and 33.1 parts isomerized $C_{16-18}$ α-olefin. The mixture is heated to 75° C., 2.6 parts ethylene glycol are added, the temperature is increased to 115° C. and is held there for 2 hours. The reaction is cooled to 85° C. whereupon 7.4 parts dimethylethanol amine are added. The temperature is maintained at 85° C. while mixing thoroughly yielding a product containing 1.1% N.

Release characteristics of the fertilizer emulsion are tested as for Example A; at 7 days, 100% of the fertilizer component was leached.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. A non-explosive water in oil emulsion fertilizer composition comprising a discontinuous aqueous phase comprising at least fertilizer component, a continuous organic phase, and an emulsifying amount of an emulsifier composition comprising:

the reaction product of an amine (C) characterized by the presence within its structure of at least one H—N group and an intermediate formed in the reaction of (A) at least one olefinic compound containing at least one group of the formula

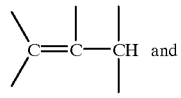 (I)

and (B) at least one carboxylic reactant selected from the group consisting of compounds of the formula

 (III)

wherein each of $R^3$ and $R^5$ is independently H or a hydrocarbyl group, $R^4$ is a divalent hydrocarbylene group, and n is 0 or 1, and reactive sources thereof, in amounts ranging from 0.6 moles (B) per mole of (A) to 3 moles (B) per equivalent of (A), and optionally, from about 0.5 to about 2 moles, per mole of (B), of (D) at least one aldehyde or ketone.

2. A composition according to claim 1 wherein the olefinic compound (A) has the general formula

 (II)

wherein each of $R^1$ and $R^2$ is, independently, hydrogen or a hydrocarbyl group and each of $R^6$, $R^7$ and $R^8$ is, independently, hydrogen or a hydrocarbyl group.

3. A composition according to claim 2, wherein $R^1$ and $R^2$ are both hydrogen, $R^7$ is hydrogen, $R^8$ is an aliphatic hydrocarbyl group, and $R^5$ is a methyl group.

4. A composition according to claim 3 wherein the olefinic compound is a polyisobutylene.

5. A composition according to claim 1, wherein the olefinic compound contains from about 30 to about 200 carbon atoms.

6. A composition according to claim 5, wherein the olefinic compound contains from about 50 to about 100 carbon atoms.

7. A composition according to claim 1 wherein (B) is at least one carboxylic reactant selected from the group consisting of compounds of the formula

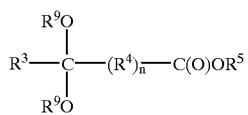

wherein each of $R^3$ and $R^5$ and each $R^9$ is independently H or a hydrocarbyl group, $R^4$ is a divalent hydrocarbylene group, and n is 0 or 1.

8. A composition according to claim 7 wherein one of $R^9$ is hydrocarbyl and one is H.

9. A composition according to claim 7, wherein both $R^9$ groups are alkyl groups.

10. A composition according to claim 8 wherein the carboxylic reactant (B) is a lower alkyl glyoxylate, lower alkyl hemiacetal.

11. A composition according to claim 1 wherein the subscript n in Formula III is zero.

12. A composition according to claim 11 wherein (B) is selected from the group consisting of glyoxylic acid and the hydrate thereof.

13. A composition according to claim 1 wherein the amine (C) is selected from the group consisting of hydroxyamines.

14. A composition according to claim 1 wherein the amine (C) is selected from the group consisting of alkylene polyamines.

15. A composition according to claim 13 wherein the amine (C) is an alkanolamine selected from the group consisting of ethanolamine, monomethylethanolamine, and diethanolamine.

16. A composition according to claim 14 wherein the amine (C) is an alkylene polyamine selected from the group consisting of ethylene polyamines and polyoxyalkylene polyamines.

17. A composition according to claim 14 wherein the amine (C) is N,N-dimethylaminopropylamine.

18. A composition according to claim 16 wherein the amine (C) is a polyoxyalkylene polyamine selected from the group consisting of polyoxyethylene-polyoxypropylene)-polyamines.

19. The composition of claim 1 wherein (D) the aldehyde or ketone is absent.

20. The composition of claim 1 wherein (D) the aldehyde or ketone is present.

21. The composition of claim 20 wherein (D) is formaldehyde.

22. The composition of claim 1 wherein the emulsifier composition is of the formula

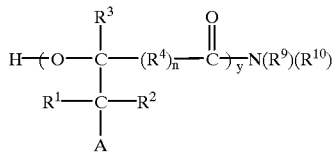

wherein each of $R^1$, $R^2$, and $R^3$ is H or a hydrocarbyl group;

$R^4$ is a divalent hydrocarbylene group;

n=0 or 1;

y is an integer ranging from 1 to about 200;

A is a hydrocarbyl group or a hydroxy-substituted hydrocarbyl group; and (a) each of $R^9$ and $R^{10}$ is independently H, alkoxyhydrocarbyl, hydroxyhydrocarbyl, hydrocarbyl, aminohydrocarbyl, N-alkoxyalkyl- or hydroxyalkyl-substituted aminohydrocarbyl, or a group of the formula $-(Y)_a R^{11}-B$, wherein each Y is a group of the formula

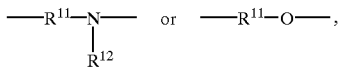

each $R^{11}$ is a divalent hydrocarbyl group, $R^{12}$ is as defined above for $R^9$ and $R^{10}$, and B is H, hydrocarbyl, amino, hydroxyhydrocarbyl, an amide group, an amide-containing group, an acylamino group, an imide group, or an imide-containing group, or a hydroxyaromatic moiety, and a is 0 to about 100; or (b) $R^9$ and $R^{10}$ taken together with the adjacent N constitute a nitrogen-containing heterocyclic group, optionally further containing one or more additional heteroatoms selected from the group consisting of N, O and S; or (c) one of $R^9$ and $R^{10}$ taken together with the adjacent N constitute a N—N group.

23. The composition of claim 1 wherein the product of (A) and (B), prior to reaction with (C), is represented by the structure

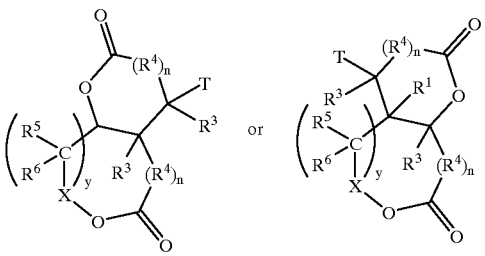

where n is 0 or 1 and y is 0 or 1;

X is a divalent hydrocarbyl group selected from the group consisting of
$C(R^6)(C(R^5)(R^7)(R^8))$ when y is 0, and
$C(R^7)(R^8)$ when y is 1
where $R^1$, each $R^3$, $R^5$, $R^6$, $R^7$, and R8 are each independently hydrogen or a hydrocarbyl group, each $R^4$ is independently a divalent hydrocarbylene group, and T is —OH or $R^5$.

24. The emulsion composition of claim 1 wherein said continuous organic phase comprises an oil.

25. The composition of claim 24 wherein the oil comprises a vegetable oil.

26. The composition of claim 24 wherein the oil comprises a mineral oil.

27. The composition of claim 1 wherein the continuous organic phase is present in amounts ranging from about 2% to about 10% by weight, the discontinuous aqueous phase is present in amounts ranging from about 90% to about 98% by weight, both based on the total weight of the emulsion composition, said fertilizer component is present in amounts ranging from about 70% to about 95% by weight, based on the total weight of the aqueous phase, and the emulsifier composition is present in amounts ranging from about 4% to about 40% by weight based on the total weight of the organic phase.

28. A method of fertilizing comprising applying a fertilizer emulsion composition of claim 1 to the soil.

29. A process for preparing a water in oil fertilizer emulsion composition comprising preparing an organic phase by mixing an organic component with from about 4 to about 40 parts by weight of an emulsifier composition comprising:

the reaction product of an amine (C) characterized by the presence within its structure of at least one H—N group and an intermediate formed in the reaction of
(A) at least one olefinic compound containing at least one group of the formula

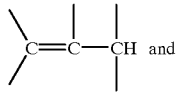
(I)

(B) at least carboxylic reactant selected from the group consisting of compounds of the formula $R^3C(O)R^4)_nC(O)OR^5$     III wherein each of $R^3$ and $R^5$ is independently H or a hydrocarbyl group R4 is a divalent hydrocarbylene group, and n is 0 or 1, and reactive sources thereof in amounts ranging from 0.6 moles (B) per mole of (A) to 3 moles (B) per equivalent of (A), and optionally, from about 0.5 to about 2 moles, per mole of (B), of
(D) at least one aldehyde or ketone, per 100 parts of organic phase, preparing an aqueous phase by dissolving in water from about 70 to about 95 parts by weight of at least one fertilizer component per 100 parts of aqueous phase, then mixing together from about 2 to about 10 parts by weight of the organic phase with aqueous phase to prepare 100 parts by weight of emulsion.

* * * * *